United States Patent [19]

Crawford et al.

[11] Patent Number: 5,261,095
[45] Date of Patent: Nov. 9, 1993

[54] PARTITIONING SOFTWARE IN A MULTIPROCESSOR SYSTEM

[75] Inventors: Douglas C. Crawford; Michael A. Denio, both of Sugar Land; Thomas M. Albers, Houston, all of Tex.

[73] Assignee: Texas Instruments Incorporated, Dallas, Tex.

[21] Appl. No.: 420,085

[22] Filed: Oct. 11, 1989

[51] Int. Cl.$^5$ .............. G06F 9/40; G06F 9/00
[52] U.S. Cl. .............. 395/650; 364/DIG. 1; 364/281.3; 364/281; 364/281.7
[58] Field of Search .............. 395/650; 364/200 MS File, 900 MS File

[56] References Cited

U.S. PATENT DOCUMENTS 4,882,674 11/1989 Quint et al. ............ 364/200
4,961,133 10/1990 Talati et al. ............ 364/200

Primary Examiner—Gareth D. Shaw
Assistant Examiner—A. Katbab
Attorney, Agent, or Firm—Robert D. Marshall, Jr.; Richard L. Donaldson; James C. Kesterson

[57] ABSTRACT

A method of partitioning a software program, so that a main program may be executed on a first processor, and at least one designated function may be executed on a second processor. The subprogram to be executed by the second processor is selected from a main program associated with a first processor and identified globally to both processors. The subprogram is given a call from the main program that creates a software environment that is compatible to both processors. More specifically, the method entails creating an argument passing means, via the function call, so that relevant information about the subprogram parameters may be communicated to the second processor.

34 Claims, 3 Drawing Sheets

PARTITIONING SOFTWARE IN A MULTIPROCESSOR SYSTEM

TECHNICAL FIELD OF THE INVENTION

This invention generally relates to computer processing, and more particularly to a method for partitioning a software program among processors for use in a multiprocessor system.

BACKGROUND OF THE INVENTION

A important development in computer processing has been multiprocessor systems, which use more than one processor, each capable of independent action, to execute an applications program. Different program tasks may be assigned to different processors, with each processor optimized to perform its assigned task, with the result that program execution time is substantially reduced. Some multiprocessor systems have processors that are dissimilar as well as separate, each having its own instruction set. Even the idea of separate processors is evolving; a developing innovation is the fabrication of dissimilar processors in the same integrated circuit.

Regardless of whether the processors are similar or dissimilar or are separately fabricated, every multiprocessor system requires a means for communication between the processors. This can be accomplished by a shared communications memory, or when there is no shared memory, by various argument passing means, such as ethernet, a bus connection, or some other communications link, or by a combination of these techniques.

In addition to the above hardware characteristics, multiprocessor systems vary with respect to the manner in which they use software. In some systems, separate processors execute different programs, and there is no need to partition the software. In contrast, when separate processors are to execute different tasks of one integrated application, software tasks must be partitioned among processors.

Some multiprocessor systems use separate programming for each processor. For example, some systems use a host processor and a slave processor, with the slave processor having a fixed set of routines. Software interfacing permits applications software running on the host to access the slave for the designated routines. A limitation of this type of system is that separate programming is required for each. Another limitation is that an applications programmer cannot change the functionality of the programming of the slave processor.

When a programmer attempts to write a single program for use by more than one processor in a multiprocessor system, the implementation is often tedious. For example, some systems permit a slave processor to be programmed in the same language as the host processor, but these systems require substantial changes to the programming code to be transferred from execution by the host to execution by the slave.

Thus, a need exists for a partitioning method, which permits a single program to be written for use by more than one processor. The method should allow the program to be partitioned among the processors with a minimum of extra programming effort.

SUMMARY OF THE INVENTION

One aspect of the invention is a method of partitioning a computer software program, so that a main program is executable by a first processor, and at least one designated subprogram may be executed by a second processor. The user selects a subprogram to be executed by the second processor and assigns it an identifier that is global to both processors. The original program is modified to create a main program, which has an argument passing means that creates a software environment common to both processors, and a subprogram capable of accepting the parameters from the main program and executing its function.

In a special embodiment of the method of partitioning a program, the subprogram's call in the main program is converted into a packet form that provides the function identification and argument passing means. By compiling the subprogram for the second processor, it becomes executable on the second processor.

A hardware aspect of the invention is a multiprocessor computer system capable of executing a single main program on a host processor, with designated functions executed on a non-host processor. The system includes a communications means for passing arguments between processors, and both processors are programmed so that the arguments of the designated function are transferred from the stack of the first processor to the stack of the second processor.

Another aspect of the invention is a method of adding a function to an existing computer program. This method uses the same steps as the preceding method of partitioning software, except that the modified function call and the subprogram definition are extensions of an existing program and permit the program to be extended for use with more than one processor.

Another aspect of the invention is a method of using a multiprocessor computer system to execute a program with more than one processor assigned to different subprograms. A subprogram to be executed by a second processor is called from a program being executed on a first processor. The subprogram's call is converted into a form that creates an argument passing means that permits the subprogram's argument data to be communicated to the second processor, where it is reassembled into a form executable by that processor.

An advantage of the invention is that a software program, which is to be executed by more than one processor, may be developed in one language using a uniprocessor system, and later installed on a multiprocessor system without the need to substantially modify the program. Execution of the program will cause the tasks appropriate for a particular processor to be executed by that processor. A further advantage is that a program may be easily re-partitioned as desired for optimum performance on a particular multiprocessor system.

BRIEF DESCRIPTION OF THE DRAWINGS

The novel features believed characteristic of the invention are set forth in the appended claims. The invention itself, however, as well as modes of use and further advantages, is best understood by reference to the following description of illustrative embodiments when read in conjunction with the accompanying drawings.

DETAILED DESCRIPTION OF THE INVENTION

Copyrighted Materials

Figure 1:
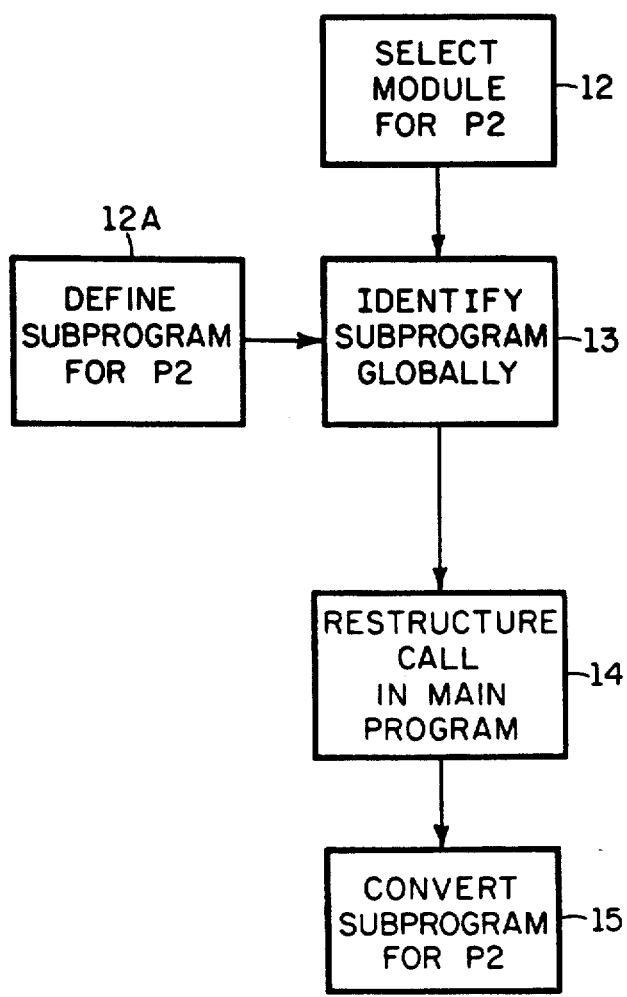
FIG. 1 is a flow diagram of a method of partitioning software for use on a multiprocessor system.

A portion of the disclosure of this patent document contains material that is subject to copyright protection. The copyright owner has no objection to the facsimile reproduction by anyone of the patent disclosure, as it appears in the Patent and Trademark Office files or records, but otherwise reserves all copyright rights whatsoever.

General Programming Environment

The description of the invention is primarily directed to implementation with programs written in the C programming language. However, the programming environment in which the invention will operate is not unique to C. Some common programming language characteristics are described below, both for definitional purposes, and for the purpose of setting out those characteristics that permit the invention to be used with other languages.

The structuring of tasks into program modules, i.e., subprograms, is a useful feature of higher level programming languages. A subprogram permits a main program to execute the process that the subprogram represents without the need to explicitly set out all the steps. This is accomplished by calling the subprogram from within the main program.

A subprogram definition is a collection of statements that describes the actions of the subprogram. A subprogram header is the first line of the subprogram definition, and serves several purposes. First, it may specify that the following syntactic unit is a subprogram definition of some kind. Second, it provides a name for the subprogram. Third, it may optionally supply a list of formal parameters.

Parameters are used to transfer information between subprograms. The use of parameters is related to a further feature of subprograms, i.e., their reusability. This is accomplished by the use of variable parameters in subprogram headings, rather than specific values. The same subprogram may be used more than once in the program, each time with a unique set of parameters, or may be used in a different program, without being entirely redefined. "Parameter" is often used synonymously with "argument". In the following description, program modules are identified with a header that provides a name for the module, i.e., a function name, and its arguments, if any. Such a header may appear as:

function_name (argument1, argument2, ... argumentn).

A subprogram call is the explicit request in the main program for the subprogram to be executed. Subprogram calls include the name of the subprogram and a list of the actual parameters to be bound to the formal parameters of the subprogram.

Generally, there are two types of subprograms: procedures and functions. Procedures, known as subroutines in Fortran, modify variables and parameters in the calling program. Functions, which are modeled after math functions, do not modify their parameters or outside variables, but rather simply return a value to the calling program. Subprograms written in Fortran or Pascal have special header words that identify the subprogram as such, i.e., "subroutine" or "procedure", respectively. On the other hand, the header of a C subprogram has no such special word. Furthermore, in C, all subprograms are functions, which are equivalent to a subroutine or function in Fortran or a procedure in Pascal. In C, it is possible to arrange for a function to modify a variable in a calling routine so that the function operates like a procedure of other languages.

Pointers are a data type that permit indirect addressing and provide a method of dynamic storage management. When a pointer is used to organize a group of data items in an area of memory, the data items are said to form a data structure. One useful data structure is a stack. Stacks may be used with pass by value parameters, which have their values copied into stack locations. Pointers and stacks are common to many languages, except Fortran, which uses indexing and static arrays.

Software Partitioning

As discussed above, an advantage of the invention is that it permits a program written in a single language for one processor, to be partitioned for use in a multiprocessor system. Using the invention, a program may be completely developed and made executable on a single processor system. Then, when desired by the user, the program may be partitioned for use in a multiprocessor system. A basic concept of the invention is that the function call in the first processor can be structured in a manner that creates a common software environment in which argument passing between processors is possible.

FIG. 1 illustrates this software development aspect of the invention. The "user" is typically an applications programmer who desires to partition a program for use on a multiprocessor system. As explained below, however, the method may be automated as to all or some of its steps, in which case the "user" may be a computer program that performs that step.

The method of FIG. 1 is a method of partitioning software, written as a single program, to be used with a multiprocessor system. Typically, program development includes the compile time operations discussed below, although some languages permit compilation when a program is loaded and run. In general, the steps of the method are selecting a module to be processed by a second processor, assigning the module an identifier that is global to both processors, modifying the function call to create an argument passing means common to both processors, and converting the subprogram definition to a form that is consistent with the argument passing means so that the subprogram is executable by the second processor.

Two embodiments of the invention are discussed in connection with FIG. 1. One embodiment is a generalized version of the invention, wherein function calls for communication to a second processor are restructured. Appendices A–C are an example of this general embodiment. Another embodiment is a special form of the invention, wherein the subprogram call is converted to a packet form, and the subprogram conversion step is simply a matter of recompiling the subprogram. Appendices D-F are an example of this special form.

The hardware environment in which the method of FIG. 1 operates has a single processor on which a program may be developed. In that program, is at least one module that is appropriate for a second processor, which may or may not be similar to the first processor. A typical multiprocessor system, such as may be used to develop software in accordance with the invention, is discussed below in connection with FIG. 3.

The method operates with a software program in any one of a number of well known higher level procedural languages. The primary requirement is that the language is not processor dependent and must be capable of being compiled on all processors to be used. Generally, the invention is directed to imperative and procedural languages. The program has at least one subprogram and has a modular structure, so that separate modules may be easily demarcated. Any module selected for execution by the second processor is, or can be, written as a subprogram with a subprogram call written in whatever calling syntax is standard for the language.

The following description is in terms of an implementation using the C programming language, where subprograms are functions. Otherwise, the syntax of C is similar to that of other higher level languages. The invention is easily modified to accommodate requirements of other higher level languages, especially Ada and Pascal. In the following programming examples, which use C calling conventions and data types, those programmers unfamiliar with C should be able sufficiently to understand the syntax to be able to adapt the method to other languages.

General Partitioning Method

In accordance with the above considerations, Step 12 is selecting a subprogram module to be executed by the second processor. This can be done manually by a programmer, or in an enhancement of the invention, automatically, by programming that recognizes functions that are associated with the second processor. Subprogram isolation is easily accomplished with block mark, move, and write utilities common to many programming language environments. The result of step 12 is two separately compilable modules: a subprogram containing the subprogram definition and a main program containing a call to the subprogram.

Appendix A is an example of a program written in C having two functions, initialize and line_test, which are intended for execution by a second processor. To perform step 12, these functions are separated into modules appropriate for compilation for the second processor.

In step 13, the function name or some other identifier is made global to both processors and placed on a list maintained by the second processor. The global function name is also assigned a corresponding command number, which is used by both processors to reference the function. When the second processor needs to find a function that is to be executed, the command number permits a pointer to be fetched to that function.

Step 14 is restructuring the subprogram call in the main program module to a special form that permits communication of the subprogram parameters to a second processor. The restructured call provides three items of information about the function to the second processor: the type of call, the function identifier, and a description of the function arguments. In accordance with the basic concept of the invention, the restructured call becomes an argument passing means that creates a common software environment for both processors.

In the preferred embodiment, step 14 is performed with the #define preprocessor directive of C. However, if the programming is in another language that lacks such a preprocessor, a substitute redefinition directive could be written.

More specifically, the first object of step 14 is to provide information about the type of call with respect to whether a value is returned or data is modified. Essentially, the type of function call determines whether the host processor will continue executing the host program while the guest processor executes the subprogram. A return value implies that the host will wait for the return. The invention supports three types of function calls, each associated with one of the following entry points:

| | |
|---|---|
| cmd | for functions that do not require any form of return data |
| return | for functions that require only a single standard C type return |
| alter | value for functions that pass pointers to data that is modified indirectly by the function called |

During run time, the different entry points permit an argument handler program to be programmed to recognize the entry point. Depending on the characteristics of the entry point, the argument handler receives information about how to perform the return or alter operations, if any.

The second object of step 14 is to identify the function to the second processor. The function's identifier is global to both processors and provides a means for the second processor to find the function that is to be executed locally. More specifically, the identifier provides a means for locating a pointer to that function. Typically, the identifier is simply a global name that is placed in a table maintained by the second processor and is assigned a corresponding command number, which is then used by both processors to reference the function.

The third object of step 14 is to describe the size and type of the data represented by the function parameters, if any, in a manner that can be communicated from processor to processor. In addition to providing the address and size of the function's arguments, structure types and a buffer definition are added to make sure that the arguments of the function reside where the communications buffer is.

Appendix B shows the function calls of Appendix A, restructured in accordance with step 14. Although Appendix B does not differentiate between various types of calls, and illustrates only functions having no return values, it is clear that an entry point could be added in accordance with the above technique to identify the type of call. In the example of Appendix B, the entry point would be cmd, which, at run time, would invoke a parameter handler program that did not expect a return value.

Step 15 is providing an executable form of the subprogram to the second processor, which may depend on the arguments of the functions. An example of a program extracted from the source program, which is to be executed on the second processor and which is the result of step 15, is set out in Appendix C. If the function has no arguments, it is simply copied over into the second processor. If the function has arguments, they are redefined as variables and associated with a pointer so that the second processor can access the argument data from the data structure created in step 14, which typically is on a stack.

Once the above steps are performed, the original program is now split into output files representing the partitioned program. The output files are compiled and linked to run on the respective processors. Each output file contains some sort of common implementation of each function, for example, in the form of a call or a definition, as described in the method above. At run time, the main program may be run on a first processor, where function calls to functions loaded to the second processor will invoke a parameter handler program. The parameter handler is programmed to recognize the restructured arguments and to accept the argument data in a meaningful way to the second processor. These run time aspects of the invention are discussed below in connection with FIG. 2.

Although steps 14 and 15 may be performed manually, such as by an applications programmer, a feature of the invention is that other computer programs may be written, such as a utility program, to perform steps 14 and 15 with a computer. For example, to perform step 14, the user might insert into the main program, special indicators to identify which modules are to run on which processor and to automatically restructure the programming. More specifically, a #define generator could involve a combination of artificial intelligence techniques and user queries to correctly determine information such as the size of indirectly referenced data. Then, once the above steps are taken, the module can be called from the main program, using that language's standard calling syntax. A compile time conversion changes the standard calling syntax into the desired restructured form.

Packet Partitioning Method

In general, FIG. 1 also illustrates the packet embodiment of the invention. Steps 12 and 13 are the same as explained above: a subprogram is selected and identified. Yet, steps 14 and 15 are different in that step 14 uses a special packet form to restructure the function call and step 15 is simply recompiling the subprogram. The packet form is therefore the argument passing means that creates the common software environment.

Appendix D is an example of a program written in C that first initializes colors in a systems palette from the pre-defined array palet[ ], and then draws lines on the screen using the line_test ( ) function. This program is capable of being executed on one processor, but in this example it is desired to call two functions, set_palet( ) and line_test( ), from a program on the a first processor for execution by a second processor. To perform steps 12 and 13, these functions are selected and globally identified.

Step 14 restructures the function call with a #define directive, with the result being a packet form of the function arguments. In the packet form, each argument is a packet, which has a packet header and packet data. The packet header has two elements: a type identifier and a size identifier, which describe the type and size of the argument data being sent. At run time, this packet form permits the data to be delivered to the memory of the second processor in a form that the second processor recognizes. At the second processor, the packets are reconverted to the standard argument format. Thus, the packet form permits the function call to be understood by both processors. These run time aspects of the invention are explained further in connection with FIG. 2.

A feature of the packet embodiment is that converting arguments to packet form is simplified by the use of additional defines in other include files, which represent a number of data types. The following is an illustrative list of data types and their application:

| | |
|---|---|
| _WORD (a) | immediate WORD argument a |
| _SWORD (a) | immediate signed WORD argument a |
| _DWORD (a) | immediate double WORD argument a |
| _BYTE_PTR (b, a) | BYTE array pointer a with b elements |
| _WORD_PTR (b, a) | WORD array pointer a with b elements |
| _DWORD_PTR (b, a) | DWORD array pointer a with b elements |
| _STRING (a) | Null-terminated string pointer a |
| _ALTBYTE_PTR (b, a) | function altered BYTE array pointer |
| _ALTWORD_PTR (b, a) | function altered WORD array pointer |
| _ALTDWORD_PTR (b, a) | function altered DWORD array pointer |

The above data types permit the packet to communicate to the second processor whether the argument is immediate or referenced indirectly in the first processor's memory. If the argument is memory referenced, it is translated into a form that the second processor can access.

In the packet form embodiment of the invention, the result of Step 14 is an include file entry that represents the module in question in the following form:

```
#define global_function_name (argument 1,
    argument 2,...argumentn)
entry_point_name (command_number, number_of_packets,
    packet1, packet2, ... packetn),
``` where each packetn has the form packet_header (packet_data). An advantage of the packet embodiment of the invention is that the user need only add this single preprocessor statement to the original program and need not make any other program changes.

Appendix E illustrates the main program module, separated from the original program of Appendix D, with the function calls to set_palet and line_test restructured in accordance with step 14. Appendix E also illustrates the use of the entry point, cmd, to differentiate among types of calls, as discussed above. The functions that were delegated to the second processor, set_palet and line_test, have been replaced with #define statements that describe their functional requirements to the compiler and to the run time environment. Referring to the example of Appendix E, the function set_palet appears in the following general form:

```
set_palet ( num_entries, palet_data)
```

This function accesses data indirectly but does not modify any data. Thus, it uses the cmd entry point. Its function number is assumed to be 0 because it is the first function defined. The function has two arguments, and thus two packets. The first argument, a, signifies the number of palette entries to set. In a given C compiler syntax, it is a "short", so the corresponding _WORD( ) packet definition is used. The second argument is a pointer to an array of shorts. The number of shorts to be accessed by the subroutine at this pointer is determined by the value of a. Thus, the _WORD_PTR( ) packet definition is used, where a is the number of shorts to be accessed at the pointer. The definition of set_palet( ) is therefore:

```
#define set_palet (a,b)
    cmd ( 0, 2, _WORD(a), _WORD_PTR (a, b))
```

As indicated above, _WORD and _WORD_PTR have been previously defined with #define to include sufficient header and size information so that the data type and its size can be determined by the parameter handler, invoked by the entry point cmd.

A particular advantage of the packet form of the invention is that step 15 is accomplished by simply recompiling the unmodified subprogram for the second processor. The subprogram definition for the second processor is the same as in the original program.

Appendix F is an example of the module split off from the program of Appendix D. This module is to be executed by the second processor, although called from the first processor. The function headers and definitions of set_palet and line_test are the same as in Appendix D.

As illustrated in Appendix F, consistent with step 13 of the invention, an array of function pointers is added to locate the pointer to a function given its command number. The array is ordered so that the function having command number 0 in the program code of the first processor is the first function pointer on the list.

Using the packet form embodiment, the partitioning method is quite simple to perform. The programmer may select and identify the desired module, add an include file entry to the main program using the #define directive, and recompile the module for the second processor. The functions to be partitioned are unmodified in source form on the first processor, and in both source and object form on the second processor.

A further feature of the invention is that a #define generator could be created with a utility program to perform step 14 automatically. Such a feature would permit the method to be implemented with only the steps of developing the program, selecting the subprogram to be run on the second processor, using the #define generator, and recompiling the subprogram on the second processor.

Extending Existing Programs

Another aspect of the invention illustrated in FIG. 1 is a method of adding a new subprogram to an existing program, for use with a multiprocessor system. The existing program is loaded to and executable by a first processor, but it is desired to extend the functionality of the system by using a second processor to execute certain tasks of that program.

The method begins with step 12A, preparing the subprogram. Like the subprograms of step 12 of the partitioning method described above, the module represents a defined function. After the module is prepared, the method follows the steps described above.

Additional Packet Form Examples

The following examples further illustrate step 14 of FIG. 1. The examples illustrate graphics functions that might be part of an applications program, to be partitioned during program development or from an existing program, for execution by a separate graphics processor. This partitioning is desirable for a system having a general purpose host processor, such as the Intel 8088, and a graphics processor designed especially to execute graphics instructions, such as the 34010 processor, manufactured by Texas Instruments, Inc.

The following four functions are listed with the type of call description to be provided in the packet form of the argument:

```
draw_a_line (x1, y1, x2, y2)cmd
poly_line (10, &point_list)cmd
i = read_point (x, y)return
copy_mem (&src, &dst, len)alter
```

If it is assumed that each function's command number was stored as cmd_id, the following four functions are listed with their packet form:

initialize_graphics ( )
  This function requires no return data and has no arguments. The include file entry is:

```
#define initialize_graphics 0 \
    cmd (cmd_id, 0)
``` fill_rectangle (w, h, x, y)
  This function requires no return data and has four arguments, all WORDS. The include file entry is:

```
#define fill_rectangle (w, h, x, y)\
    cmd (cmd_id, 4, _WORD (w),\
    _WORD(h), _WORD(x), _WORD(y))
``` poly_line (n, &linelist)
  This function requires no return data and has two arguments, WORD, n and WORD_PTR, line_list. The include file entry is:

```
#define poly_line (n, ptr)\
    cmd (cmd_id, 2, _WORD (n),\
    _WORD_PTR (2*n, ptr))
``` where the second 2 represents the ratio of _WORD element size to the _WORD_PTR element size.

init_matrix (&matrix)
  This function initializes the array pointed to by &matrix indirectly. It has one argument, which points to a 4×4 element function altered array. The include file entry is:

```
#define init_matrix (ptr)\
    alt (cmd_id, 1, _ALTDWORD_PTR\
    (16, ptr))
```

Run Time Method

Figure 2:
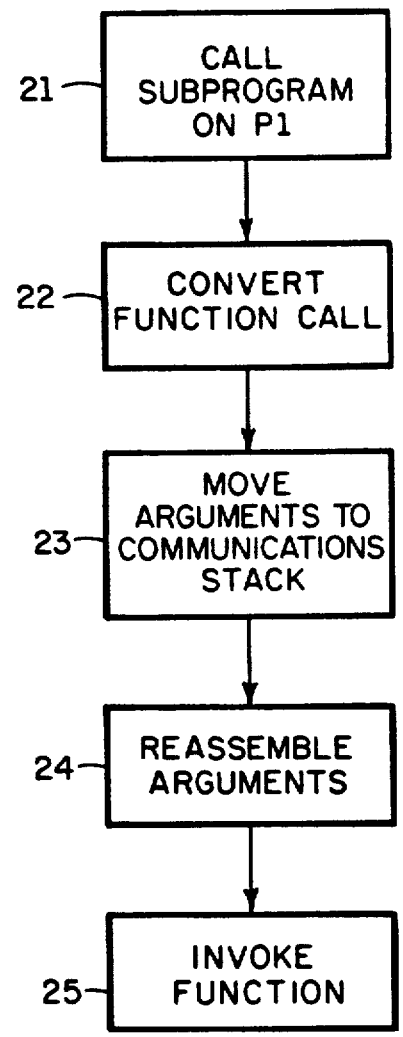
FIG. 2 is a flow diagram of a method of using two processors to execute a single program.

FIG. 2 illustrates another aspect of the invention, a method of using two processors to execute a single program. As distinguished from the method of FIG. 1, the method of FIG. 2 is a run time process. The method is used while executing a main program on a first processor. The main program has at least one subprogram to be executed by a second processor. This subprogram is compiled and loaded to the second processor, which may occur any time before execution. Basically, the steps of the method are calling, from the main program, the subprogram to be executed by the second processor, and converting the function call into a form that creates an argument passing means common to both processors and that permits the second processor to accept the subprogram parameters. The call is communicated to the second processor where it is reassembled into a standard function call form.

Figure 3:
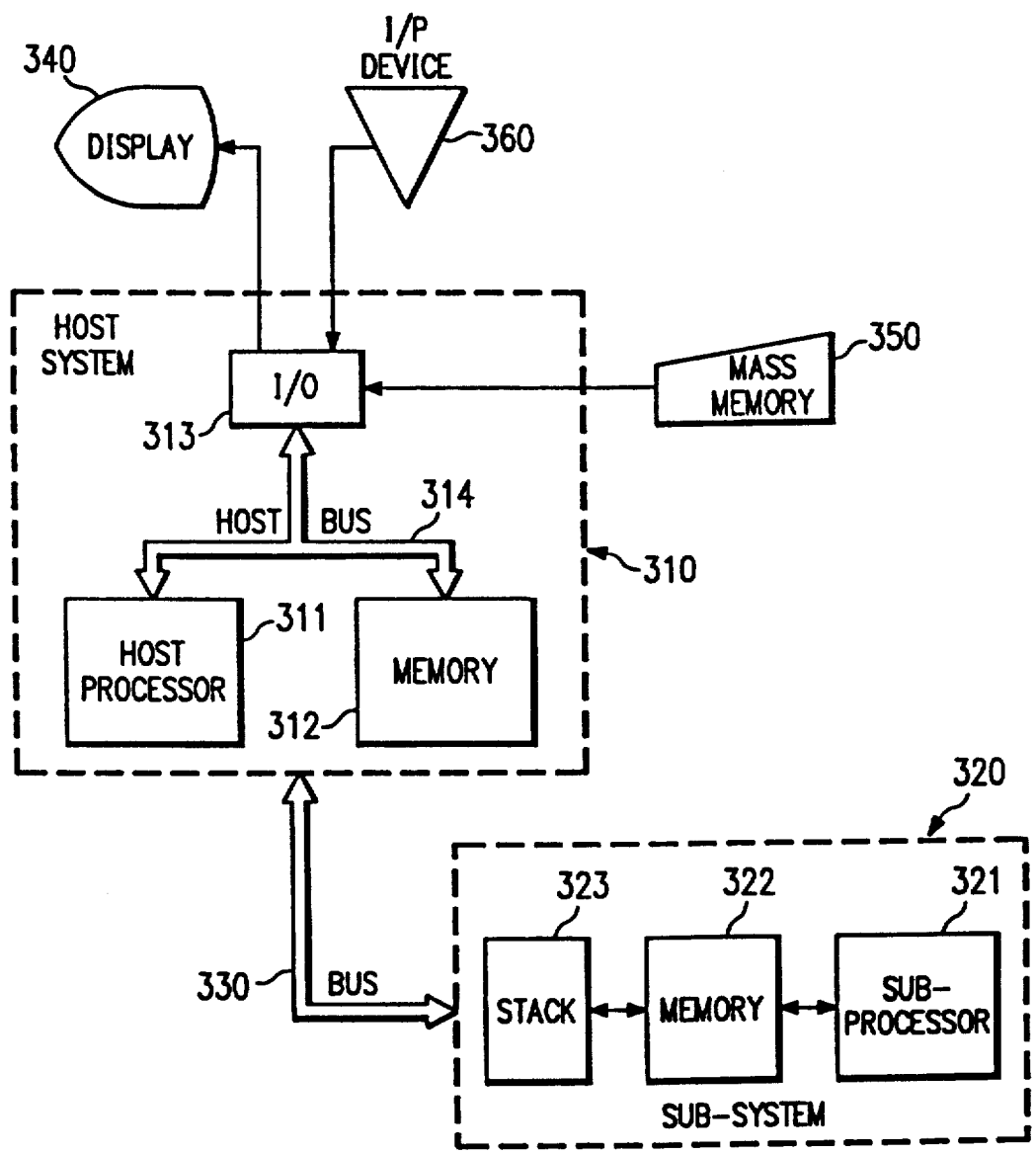
FIG. 3 is a block diagram showing the hardware environment of the method of FIG. 2.

The method of FIG. 2 is for use on a multiprocessor system having a communication means. FIG. 2 is best understood with reference to FIG. 3, which is a block diagram of a computer system having both a host processor system 310 and a subprocessor system 320. Processors 311 and 321 each have their own memory, 312 and 322. A communication means between the two processors is embodied by bus 330 and communications buffer 323. Bus 330 is bidirectional and provides a sixteen bit data path and nine control lines. Communications buffer 323 can be accessed by both processor systems 310 and 320. Other hardware implementations of a communications means are possible with the primary requirement being that each processor 311 and 321 have access to parameter space for handshaking between processors, function identification space to identify the function being called, and data space to pass command arguments and additional data. The configuration shown in FIG. 3 is only one of numerous means for providing interprocessor communications, and other means are easily developed. Furthermore, although FIG. 3 shows the two processor systems, 310 and 320, as having separate memories 312 and 322, the communications means may be a shared memory.

The multiprocessor system of FIG. 3 operates with various standard peripheral devices, notably a display 340, mass storage 350, and input devices 360, such as a keyboard mouse. An I/O circuit 313 is used to communicate information in appropriate form between these input and output devices and the other parts of host system 310, via a host system bus 314. Display 340 and input devices 360 permit a user to interact with the host processor system 310. If the second processor system 320 is used for graphics tests, display 340 may be coupled to processor 321 rather than to host system 310.

Figure 4:
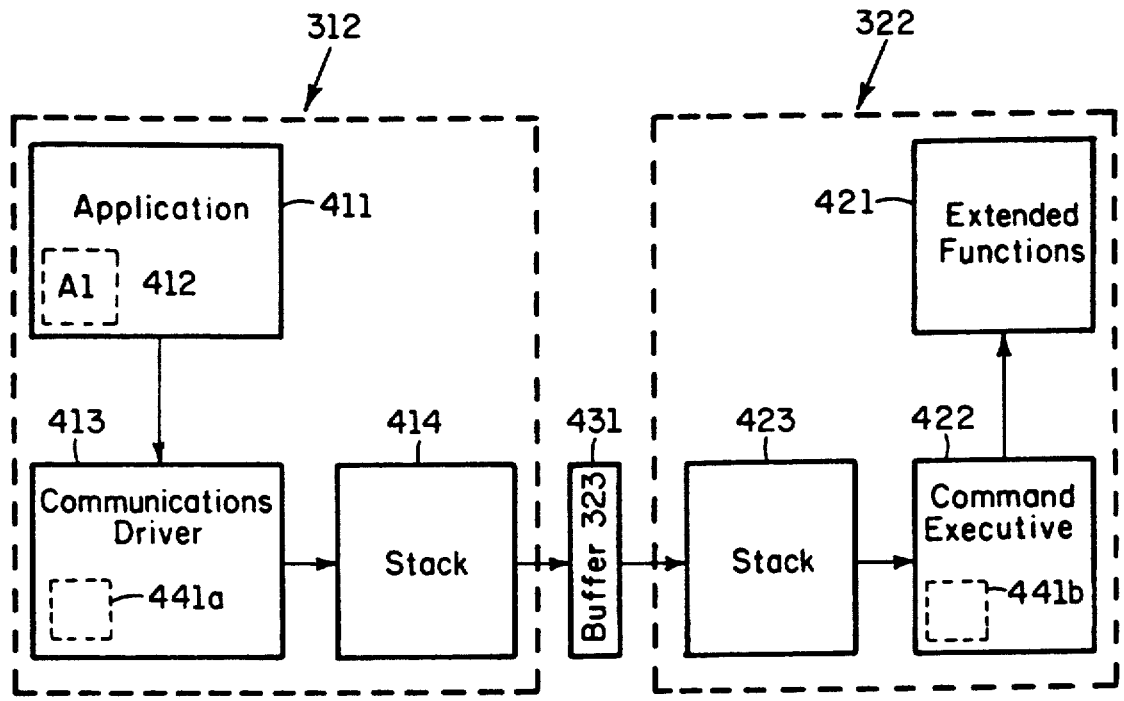
FIG. 4 is a block diagram of the software devices used to implement the packet form of the invention.

FIG. 4 illustrates the software environment in which the method operates. As shown in FIG. 4, a number of software devices are loaded to two different processors, such as processors 310 and 320 of FIG. 3, having memories 312 and 322. An applications program 411 is loaded to the first processor system 310 and has an applications interface 411 comprised of header files that reference extended functions 421, which are executable on a second processor system 320. The first processor system 310 also has a communications driver 413 and a stack 414. Extended function definitions 421 are loaded in memory 322 of the second processor system 320 and are accessed by means of a command executive 422. The second processor system 320 also has a stack 423. As explained in connection with FIG. 3, a communications buffer 323 provides memory space for passing data between processors.

Although this description is directed to the use of stacks, which is the orientation of the C programming language, in other embodiments of the invention, a structure other than a stack could be used. The essential feature is that the memory appear the same to both processors 311 and 321. The structure could also be a shared memory. The commonality of the memory and of the memory contents permit the function call to be easily communicated and understood by both processors 311 and 321.

FIG. 4 also illustrates the concept of an argument handler, which is a special argument passing program that performs the run time tasks of removing the arguments from the stack 414 of the first processor system 310 and passing them to a second processor system 320, and of reassembling them after they have been passed so that they may be pushed in high level language format to the stack 423 of the second processor system 320. The argument handler consists of programmed instructions, to carry out the tasks explained below. These instructions can be programmed without undue effort once the tasks of the argument handler are understood in accordance with the invention. As explained below, the effect is to create a software run time environment that is compatible for both processor systems 310 and 320. This environment permits both processors 311 and 321 to recognize special argument passing means, specifically the general restructured arguments and the packet arguments discussed above.

In the embodiment of FIG. 4, argument handlers reside on both processor systems 310 and 320, and are designed for a one way communication. It should be understood, however, that the argument handlers could be symmetrical, permitting two way parameter exchanges. Each argument handler would then be capable of both parsing packets from a stack, as well as reassembling packets to push to a complementary processor stack. Furthermore, in an integrated multiprocessor system, there might be a single argument handler for all processors in the system. Thus, in FIG. 4, an argument handler 441a is linked to communications driver 413, and is in communication with stack 414. A second argument handler 441b is linked to command executive 422, and is in communication with stack 423.

Referring again to FIG. 2, step 21 of the run time method is calling a function to be executed by the second processor 321. In step 22, the function call is given a special argument passing form to permit interprocessor communication. As explained above in connection with FIG. 1, the call contains information that provides the second processor 321 with information about which function to call, the function's arguments, and what to do with the return value, if any.

To more specifically illustrate step 22, referring to the example of Appendices D-F, the function to be executed is:

set_palet (num_entries, palet)

At run time, this function is invoked with:

set_palet (16, palet)

, where palet is a pointer to an array in memory 312 of the first processor system 310. The call to the function is transformed to the expression:

cmd ( 0, 2, _WORD (16), _WORD_PTR (16, palet))

. Although this description is directed to the packet form of argument passing and the argument handlers 441a and 441b are programmed to recognize that format and to process the arguments accordingly, the method and the argument handler could be easily modified to accommodate other argument passing means consistent with the general partitioning method described above.

Step 23 is transferring the function arguments from stack 414 of the first processor system 310 to communications buffer space 431.

To perform step 23, the preferred embodiment of the invention uses an argument passing utility program, such as the argument handlers 441a and 441b of FIG. 4. At the first processor system 310, argument handler 441a is invoked by the call of the subprogram to be run on the second processor system 320. The argument handler 441a is programmed to understand the restructured function call discussed above in connection with FIG. 1. If the packet form is used, the primary task of the argument handler 441a at the first processor system 310 is to convert the packet form of the parameters into actual packets for interprocessor communication and place them in a communications buffer space 431.

Figure 5:
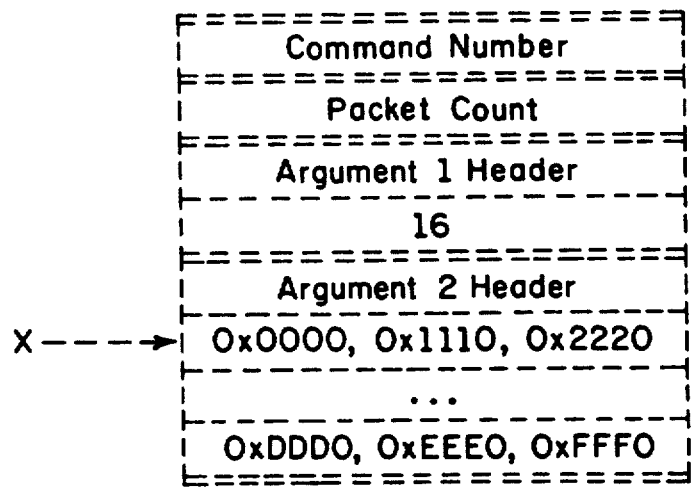
FIG. 5 is an example of a communications buffer, to which arguments have been passed in accordance with the run time method of the invention.

Referring to Appendix F to more specifically illustrate step 23, after argument handler 441a is invoked by the entry point, cmd, it reads the command number from stack 414 and places it in communications buffer space 431. Next, it reads the packet count, which is 2, and places it in the communications buffer space 431. It then proceeds to copy over the C packets themselves. The first argument is seen to be immediate data, with a constant value of 16, and is simply copied over. Enough header information is supplied to identify the constant to argument handler 441b on the second processor system 320. The second argument is to be referenced indirectly. Here, the size, 16 words, is used to copy the data that is pointed to by the pointer, palet, into the communications buffer space 431. Thus, the pointer is converted into a string of immediate data. FIG. 5 is an illustration of the communications buffer after step 23 is complete.

Implicit in step 23 is physically communicating the stack 414 to the second processor system 320, which involves communication over the physical link between the processor systems 310 and 320 and requires certain hardware and a communication interface, which are described in connection with FIG. 3. The result of step 23 is a communications buffer space 431 in the second processor system 320 that contains data and packet information referenced by the stack 414 of the first processor system 310. If one of the parameters is a reference, such as a pointer, the reference itself is not copied over, only the data that is referenced by the pointer is copied.

Step 24 is taking the argument data from the communications buffer and placing it in standard C format on the stack 423 of the second processor system 320. This step includes reassembling the arguments into the standard high level language argument form, executable by the second processor 321.

To perform step 24, the preferred embodiment of the invention uses an argument passing utility, such as the argument handler discussed above. At the second processor system 320, the argument handler 441b is invoked by the communications driver. If an argument is to be passed by reference, the argument handler uses a pointer to access memory 312 of the first processor 311.

Referring to the example of Appendix F, in step 24, argument handler 441b reads the data in each packet from communications buffer space 431 and places it on the second processor's stack 423. Referring to FIG. 5, first, argument handler 441b reads and saves the command number, and reads the packet count. The first argument is found to be an immediate reference, detectable by its header, and the data value, 16, is pushed onto stack 423. The second argument is seen to be a pointer value, detectable by its header. Because the argument handler 441b expects to read a pointer and not a string of immediate data, it pushes the pointer to the data in the communication buffer space 431, which is labeled "X" on FIG. 5, onto stack 423. In this manner, the data string is converted back into pointer form.

Step 25 is invoking the function referenced by the command number passed as an argument. Once the arguments have been copied over, the command number is used to reference a pointer to the desired function via a global table, such as discussed above in connection with step 13 of FIG. 1. The function may now be called with the C compatible stack 423 it was compiled to expect.

Appendices G-I are an example of an implementation of argument handler 441, and in particular illustrate an argument handler used with the packet form of the invention. Appendix G implements argument handler 441a, having common routines called from the entry points. Appendix H is an example of a co-alt entry point, consistent with the alt entry point discussed above in connection with step 14 of FIG. 1. Appendix I implements argument handler 441b.

As indicated above, depending on whether the function executed on the second processor system 320 returns a value or modifies data, a different entry point may be used to invoke the argument handler 441b. The argument handlers 441 perform whatever memory moves are required to update the environment of the first processor system 310. Thus, at run time, additional steps may be required to return the value or modify the data. For example, although not shown in FIG. 2 or in Appendix F, if the function returned a value, an additional step would be to copy back any data from the communications buffer space 431 that was potentially modified by the called routine. Thus, if set_palet were expected to modify palet values, then after the call, the first processor 311 would read back the string of data starting at location "X" on FIG. 5 from communications buffer space 431, and place it back in host memory 311 at the location palet, which was passed to it upon calling the entry point. As a result of the above steps, the function may now be executed by the second processor 322.

In an enhancement of the invention, there may be several communications buffers. These additional buffers permit the first processor 311 to download data into one buffer while the second processor 321 is executing data from another buffer.

Three or More Processors and LAN's

Although the above description is in terms of two processor systems 310 and 320, each of the above aspects of the invention may be used with systems having three or more processors. The function calls are then directed to the appropriate processor. In this connection, an important application of the invention is with a local or wide area network. The invention then permits a user at any one station to permit his or her program to be partitioned between his or her station and another station.

Other Embodiments

Although the invention has been described with reference to specific embodiments, this description is not neant to be construed in a limiting sense. Various modifications of the disclosed embodiment, as well as alternative embodiments of the invention will become apparent to persons skilled in the art upon reference to the description. It is, therefore, contemplated that the appended claims will cover such modifications that fall within the true scope of the invention.

APPENDICES

The disclosure of this patent document incorporates the attached appendices, which are summarized as follows:

Appendices A-C are an example of the general form of partitioning software in accordance with the invention.

Appendices D-F are an example of the packet embodiment of partitioning software.

Appendices G-I are listings of the argument handler illustrated in FIG. 4 and used to transfer function arguments from one processor to another.

```
/************************************************************/
/*                                                          */
/*       This module runs on one processor before           */
/*       partitioning                                       */
/*                                                          */
/************************************************************/ main()
{
        int i, j;

/* Draw lines */
        for (i=0, j=480; i<=640; i+64, j-48)
                line_test (i, 0, 0, j, 0x11111111);

}
short paint_pal[] = {
        0x0000, 0xF000, 0x00F0, 0xF0F0, 0x0F00, 0xFF00, 0x0FF0,
        0xFFF0, 0xA0F0, 0x35B0, 0x37F0, 0x4940, 0xF960, 0x69F0,
        0x05F0, 0x6760
};

initialize()
{
        init_video(1);
        init_grafix();
        init_vuport();
        init_text();

new_screen(0,paint_pal);
        set_color0(0);
        set_color1(0x77777777);
} line_test(x1,y1,x2,y2,color)
short x1,y1,x2,y2;
long color;
{
        set_color1(color);
        draw_line(x1,y1,x2,y2);
}
```

Appendix A

```c
/******************************************************************/
/*                                                                */
/*      This module contains the main program code left           */
/*      after partitioning, to be run on P1.                      */
/*                                                                */
/******************************************************************/
extern short far init_exec();
extern short far p2_command();

include <stdio.h> define INITIALIZE      0
define LINE_TEST       1 union {
        short     cm_buffer  [0x800];
        struct {
                short     command;
        } initialize_data;
        struct {
                short     command;
                short     x1;
                short     y1;
                short     x2;
                short     y2;
                long      color;
        } line_test_data;
} far command;

main()
{
        init i,j;

/* Added Initialization Routine */
        if (!init_exec())
        { printf("Executive not loaded\n"); exit(1); }

/* Initialize the second processor */
        command.initialize_data.command = INITIALIZE;
        p2_command(&command,sizeof(command.initialize_data));

/* Draw lines */
        for (i=0, j=480; i<=640; i+=64, j-=48)
        {
         command.line_test_data.command = LINE_TEST;
         command.line_test_data.x1      = i;
         command.line_test_data.y1      = 0;
         command.line_test_data.x2      = 0;
         command.line_test_data.y2      = j;

command.line_test_data.color   = 0x11111111;
         p2_command(&command,sizeof /
                (command.line_test_data));
        }
```

Appendix B

```c
/*******************************************************************/
/*                                                                 */
/*       This module contains the code for the second              */
/*       processor, P2.                                            */
/*                                                                 */
/*******************************************************************/

/* Reference global data pointer */
extern short *ptdata;

/* Define number of subparagraph
short num_functions = 2;

/* Define subprograms as static to avoid name conflicts */
static initialize();
static line_test();

/* Declare function pointer array */
int (p2call[])() = {
                   &initalize,
                   &line_test
                   };

/* Leave in original global defines */
short paint_pal[] = {
     0x0000, 0xF000, 0x00F0, 0xF0F0, 0x0F00, 0xFF00, 0x0FF0,
     0xFFF0, 0xA0F0, 0x35B0, 0x37F0, 0x4940, 0xF960, 0x69F0,
     0x05F0, 0x6760
}

/* Copy over subprogram having no args */
static initialize()
{
     init_video(1);
     init_grafix();
     init_vuport();
     init_text();

new_screen(0,paint_pal);
     set_color0(0);
     set_color1(0x7777777);
}

/* Create typedef argument structure */
typedef struct {
                short x1,y1,x2,y2;
                long color;
                } LINE_TEST_ARGS;

/* Copy over static function */
static line_test()

{
     register LINE_TEST_AGS *ap=(LINE_TEST_ARGS*) ptdata;
     draw_line(ap->x1,ap->y1,ap->x2,ap->y2);
     }
```

Appendix C

```
/****************************************************************/
/*                                                              */
/*      This module runs on one processor before                */
/*      partitioning.                                           */
/*                                                              */
/****************************************************************/ short palet[] = {
    0x0000, 0x1110, 0x2220, 0x3330, 0x4440, 0x5550, 0x6660,
    0x7770, 0x8880, 0x9990, 0xAAA0, 0xBBB0, 0xCCC0, 0xDDD0,
    0xEEE0, 0xFFF0};

main()
{
    short i,j;

/* Initialize the System Palet (16 values) */
    set_palet( 16, palet );

/* Draw some lines using specified color */
    for(i=0,j=480; i<=640; i+=64,j-=48)
        line_test( i, 0, 0, j, 0x22222221) );
} set_palet( num_entries, palet_data )
short num_entries;
short *palet_data;
{
    short i;

for( i=0; i<num_entries; i++)
        set_palet_entry( i, *palet_data++ );
} line_test( x1, y1, x2, y2, color )
short x1,y1,x2,y2,color;
long color;
{
    set_color( color );
    draw_line( x1, y1, x2, y2 );
}
```

Appendix D

```
/****************************************************************/
/*                                                              */
/*      This module contains the main program code              */
/*      after C packet partitioning to be run on P1.            */
/*                                                              */
/****************************************************************/ define set_palet(a,b) \
    cp_cmd( 0, 2, _WORD(a), _WORD_PTR(a,b) )

#define line_test(a,b,c,d,e) \
    cp_cmd( 1, 5, _WORD(a), _WORD(b), _WORD(c), _WORD(d), \
    _DWORD(e) )

short palet[] = {
    0x0000, 0x1110, 0x2220, 0x3330, 0x4440, 0x5550, 0x6660,
    0x7770, 0x8880, 0x9990, 0xAAA0, 0xBBB0, 0xCCC0, 0xDDD0,
    0xEEE0, 0xFFF0 };

main()
{
    short i,j;

/* Initialize the System Palet (16 values) */
    set_palet( 16, palet );

/* Draw some lines using specified color */
    for (i=0,j=480; i<=640; i+=64,j-=48)
        line_test( i, 0, 0, j, 0x222222221) )
}
```

Appendix E

```
/****************************************************************/
/*                                                              */
/*      This module contains the code for the second            */
/*      processor, P2.                                          */
/*                                                              */
/*      The function identifier array has been added            */
/*      to relate command numbers with their function           */
/*      pointers.                                               */
/*                                                              */
/****************************************************************/ int (*functions[])() = {
                        &set_palet,
                        &line_test };

set_palet( num_entries, palet_data )
short num_entries;
short *palet_data;
{
    short i;
```

```
        for( i=0, i<num_entires; i++)
            set_palet_entry( i, *palet_data++ );
} line_test( x1, y1, x2, y2, color )
short x1,y1,x2,y2,color;
long color;
{
        set_color( color );
        draw_line( x1, y1, x2, y2 );
}
```

Appendix F

```
        Page    58,132
        Title   CP              Copyright (c) 1988,89 Texas Instruments Inc.
;*******************************************************************************
;
; Name:         CP              C Packet Common Routines
;
;*******************************************************************************
;
; Module Functional Description:
;
;       This module contains code for TIGA C packet callable
;       routines that are common for all C packet entry points.
;
;*******************************************************************************
        Page
;
; Public Declarations
;
        Public  Packet          ; Send C packet routine
        Public  Allocate        ; Allocate memory routine
        Public  Alter           ; Handle altered data routine
        Public  Parse           ; Parse C packets routine
;
; External Declarations
;
Code    Segment Byte Public 'CODE'      ; Standard code segment
        Extrn   Exec_Cmd:Near           ; Execute TIGA command         (COM_ROUT)
        Extrn   Wait_Cmd:Near           ; Wait for command complete    (COM_ROUT)
Code    Ends                            ; End of code segment
Data    Segment Byte Public 'DATA'      ; Standard data segment
        Extrn   Cmd_BufL:Word           ; Current buffer                 (DATA)
        Extrn   Cmd_BufH:Word           ;               command address  (DATA)
        Extrn   Data_BufL:Word          ; Current buffer                 (DATA)
        Extrn   Data_BufH:Word          ;               data address     (DATA)
        Extrn   Current_Cmd:Word        ; Current command code           (DATA)
Data    Ends                            ; End of the data segment
;
; Include Files
;
        Include Defs.Inc        ; Include hardware dependent items
        Include Macro.Inc       ; Include macro definitions
        Initialize              ; Setup the processor options
        Page
;
; LOCAL Equates
;
IMMEDIATE       Equ     01h     ; Immediate/pointer packet type flag
ALTERED         Equ     80h     ; Altered data packet type flag
STRING          Equ     40h     ; String data packet type flag
HEADER          Equ     10h     ; Data packet header size (Bit)
TYPE_MASK       Equ     3Fh     ; Data packet type mask
NULL            Equ     00h     ; ASCII code for NULL character
MAX_WORD        Equ     0FFFFh  ; Maximum value for a word
        Page
;
; Define the local stack frame
;
```

```
Stack_Frame     Struc           ; Define the local stack frame
Saved_BP        Dw      ?       ; Saved BP register value
Ret_Addr        Dd      ?       ; Return address (Far return)
Command_Code    Dw      ?       ; C packet command number
Packet_Count    Dw      ?       ; Number of data packets
Packet_Data     Dw      ?       ; Start of the packet data Stack_Frame     Ends            ; End of the local stack frame
;
;       Define the standard code segment
;
Code    Segment Byte Public 'CODE'      ; Standard code segment
        Assume  cs:Code, ds:Data, es:nothing
        Page
;*************************************************************
;
;  Routine Functional Description
;
;       Packet(Stack_Frame, Pointer)
;
;               Put command code into the buffer
;               Setup the data pointer address
;               Output packet count to data buffer
;               While more packets to output
;                       Get the next data packet type
;                       If packet type is immediate data
;                               Get number of data bytes
;                               Round number of bytes to even amount (Up)
;                               Output the number of data bytes
;                               Compute the number of words to output
;                               Setup pointer to data bytes (Stack)
;                               While more words to output
;                                       Get the next data word (2 bytes)
;                                       Output this data word
;                                       Decrement the word counter
;                               EndWhile
;                       Else
;                               If packet type is string data
;                                       Parse string to get number of bytes
;                               Else
;                                       Get number of data bytes from stack
;                               Endif
;                               Round number of bytes to even amount (Up)
;                               Output the number of data bytes
;                               Compute the number of words to output
;                               Get pointer to the data bytes
;                               While more words to output
;                                       Get the next data word (2 bytes)
;                                       Output this data word
;                                       Decrement the word counter
;                               EndWhile
;                       Endif
;                       Decrement the packet counter
;               EndWhile
;               Return control to the caller
;
;       Registers on Entry:
;
;               DS      = Data segment
;               ES      = Host port segment (If memory mapped)
;               SS:BP   = Pointer to stack frame
;               DI:SI   = Pointer to TIGA data buffer (Standard or Allocated)
;
;       Registers on Exit:
;
;               AX-DX   = Destroyed
;               SI-DI   = Destroyed
;               BP      = Stack frame pointer updated
;
;*************************************************************
Packet          Proc    Near            ; C packet send packet procedure
        If      MEMORY EQ FALSE
        Set_IO                          ; Initialize IO state
        Endif
        mov     bx,ds:[Cmd_BufL]        ; Get address of
```

```
        mov     cx,ds:[Cmd_BufH]         ;              command buffer (Bit)
        Write_HSTADDR  cx,bx             ; Setup to write command/data buffer
        mov     ax,ss:[bp.Command_Code]  ; Get the requested command code
        Write_HSTDATA  ax                ; Write command code to the buffer
        Write_HSTADDR  di,si             ; Setup the actual data buffer address
        mov     di,ss:[bp.Packet_Count]  ; Get the number of data packets
        Write_HSTDATA  di                ; Send the number of data packets
        or      di,di                    ; Check for data packets to send
        jz      Packet_Exit              ; Jump if no data packets to send
        push    ds                       ; Save the DS segment register
        lea     bp,ss:[bp.Packet_Data]   ; Setup to send the data packets
Send_Packet:
        mov     ax,ss:[bp]               ; Get the next packet type
        add     bp,2                     ; Increment past the packet type
        Write_HSTDATA  ax                ; Send the data packet type
        test    ax,IMMEDIATE             ; Check for immediate or pointer packet
        jnz     Do_Pointer               ; Jump if a pointer type packet
Do_Immediate:
        mov     cx,ss:[bp]               ; Get the immediate data size (Bytes)
        add     bp,2                     ; Increment past the data size
        inc     cx                       ; Convert data
        shr     cx,1                     ;              size to
        shl     cx,1                     ;                       even bytes
        Write_HSTDATA  cx                ; Send the immediate data size
        shr     cx,1                     ; Convert data size to words
        mov     si,bp                    ; Setup pointer
        mov     ax,ss                    ;               to the
        mov     ds,ax                    ;                       immediate data
Send_Immediate:
        lodsw                            ; Get the next data word to send
        Write_HSTDATA  ax                ; Send this data word to buffer
        loop    Send_Immediate           ; Loop till all data words sent
        mov     bp,si                    ; Update the packet pointer
        jmp     short Next_Packet        ; Go handle the next data packet
Do_Pointer:
        test    ax,STRING                ; Check for standard or string pointer
        jz      Standard_Ptr             ; Jump if a standard pointer packet
String_Ptr:
        add     bp,2                     ; Skip past packet size (Zero anyway)
        mov     cx,MAX_WORD              ; Setup to calculate string length
        lds     si,ss:[bp]               ; Setup pointer to pointer data
Next_Character:
        lodsb                            ; Get next character from the string
        or      al,al                    ; Check for end of string (NULL)
        jz      End_String               ; Jump if we found the end of string
        loop    Next_Character           ; Loop till we find the end of string
End_String:
        neg     cx                       ; Compute string length including NULL
        jmp     short Write_Length       ; Go continue with the pointer packet
Standard_Ptr:
        mov     cx,ss:[bp]               ; Get the pointer data size (Bytes)
        add     bp,2                     ; Increment past the data size
Write_Length:
        inc     cx                       ; Convert data
        shr     cx,1                     ;              size to
        shl     cx,1                     ;                       even bytes
        Write_HSTDATA  cx                ; Send the pointer data size
        shr     cx,1                     ; Convert data size to words
        lds     si,ss:[bp]               ; Setup pointer to pointer data
        add     bp,4                     ; Increment past the data pointer
        jcxz    Next_Packet              ; Skip packet if no data to send
Send_Pointer:
        lodsw                            ; Get the next data word to send
        Write_HSTDATA  ax                ; Send this data word to buffer
        loop    Send_Pointer             ; Loop till all data words sent
Next_Packet:
        dec     di                       ; Decrement the packet counter
        jnz     Send_Packet              ; Jump if more packets to send
        pop     ds                       ; Restore the DS segment register
Packet_Exit:
        ret                              ; Return control to the caller
Packet   Endp                            ; End of the Packet procedure
        Page
```

```
;*****************************************************************************
;
;   Routine Functional Description
;
;       Allocate(Size)
;
;               Get current command address
;               Write memory allocate command to buffer
;               Write requested memory amount to buffer
;               Call routine to execute command
;               Call routine to wait for command completion
;               Get current data buffer address
;               Get the memory pointer value
;               If memory pointer is null
;                       Clear carry indicating memory is available
;               Else
;                       Set carry indicating no memory available
;               Endif
;               Return control to the caller
;
;       Registers on Entry:
;
;               DS    = Data segment
;               ES    = Host port segment (If memory mapped)
;               CX:BX = Amount of memory to allocate (Bytes)
;
;       Registers on Exit:
;
;               AX-DX = Destroyed
;               DI:SI = Pointer to allocated memory (Bit)
;               FL    = Carry set if memory not available
;
;*****************************************************************************
Allocate        Proc    Near            ; C packet allocate memory procedure
        If      MEMORY EQ FALSE
        Set_IO                          ; Initialize IO state
        Endif
        mov     si,ds:[Cmd_BufL]        ; Get address of
        mov     di,ds:[Cmd_BufH]        ;           command buffer (Bit)
        Write_HSTADDR   di,si           ; Setup to write command buffer
        mov     ax,PALLOC_COMMAND       ; Get the memory allocate command
        Write_HSTDATA   ax              ; Send the memory allocate command
        Write_HSTDATA   bx              ; Send requested
        Write_HSTDATA   cx              ;           memory amount (Bytes)
        call    Exec_Cmd                ; Call routine to execute command
        call    Wait_Cmd                ; Call routine to wait till complete
        mov     si,ds:[Data_BufL]       ; Get address of
        mov     di,ds:[Data_BufH]       ;           data buffer (Bit)
        Write_HSTADDR   di,si           ; Setup to read the data buffer
        Read_HSTDATA    si              ; Get pointer to
        Read_HSTDATA    di              ;           allocated memory
        mov     ax,si                   ; Check for a
        or      ax,di                   ;           NULL pointer (No memory)
        stc                             ; Default to memory NOT available
        jz      Allocate_Exit           ; Jump if memory is NOT available
        clc                             ; Clear carry indicating no errors
Allocate_Exit:
        ret                             ; Return control to the caller
Allocate        Endp                    ; End of the Allocate procedure
        Page
;*****************************************************************************
;
;   Routine Functional Description
;
;       Alter(Stack_Frame, Pointer)
;
;               Save the required registers
;               Put command code into the buffer
;               Setup the data pointer address
;               Output packet count to data buffer
;               Zero the altered packet count
;               While more packets to output
;                       Get the next data packet type
;                       If packet type is altered
;                               Save the current TIGA buffer address
;                               Save the packet address (Host)
```

```
;                                       Save the packet data count
;                                       Increment altered packet counter
;                               Endif
;                               If packet type is immediate data
;                                       Get number of data bytes
;                                       Round number of bytes to even amount (Up)
;                                       Output the number of data bytes
;                                       Compute the number of words to output
;                                       Setup pointer to data bytes (Stack)
;                                       While more words to output
;                                               Get the next data word (2 bytes)
;                                               Output this data word
;                                               Decrement the word counter
;                                       EndWhile
;                               Else
;                                       If packet type is string data
;                                               Parse string to get number of bytes
;                                       Else
;                                               Get number of data bytes from stack
;                                       Endif
;                                       Round number of bytes to even amount (Up)
;                                       Output the number of data bytes
;                                       Compute the number of words to output
;                                       Get pointer to the data bytes
;                                       While more words to output
;                                               Get the next data word (2 bytes)
;                                               Output this data word
;                                               Decrement the word counter
;                                       EndWhile
;                               Endif
;                               Decrement the packet counter
;                       EndWhile
;                       Call routine to execute command
;                       Call routine to wait for command completion
;                       While more altered packets
;                               Restore packet data count
;                               Restore packet buffer address (Host)
;                               Restore TIGA buffer address
;                               Adjust TIGA buffer address
;                               Compute the number of words to transfer
;                               While more words to transfer
;                                       Get the next word from TIGA buffer
;                                       Save data word in Host buffer
;                                       Decrement the word counter
;                               EndWhile
;                               Decrement altered packet counter
;                       EndWhile
;                       Return control to the caller
;
;       Registers on Entry:
;
;               DS      = Data segment
;               ES      = Host port segment (If memory mapped)
;               SS:BP = Pointer to stack frame
;               DI:SI = Pointer to TIGA data buffer (Standard or Allocated)
;
;       Registers on Exit:
;
;               AX-DX = Destroyed
;               SI-DI = Destroyed
;               BP      = Stack frame pointer updated
;
;************************************************************************
Alter           Proc    Near            ; C packet handle altered procedure
        Save    ds                      ; Save the required registers
        If      MEMORY EQ FALSE
        Set_IO                          ; Initialize IO state                   IO
        Endif
        mov     bx,ds:[Cmd_BufL]        ; Get address of
        mov     cx,ds:[Cmd_BufH]        ;                       command buffer (Bit)
        Write_HSTADDR   cx,bx           ; Setup to write command/data buffer
        mov     ax,ss:[bp.Command_Code] ; Get the requested command code
        Write_HSTDATA   ax              ; Write command code to the buffer
        Write_HSTADDR   di,si           ; Setup the actual data buffer address
        xor     bx,bx                   ; Initialize altered packet counter
        mov     di,ss:[bp.Packet_Count] ; Get the number of data packets
```

```
            Write_RSTDATA    di                      ; Send the number of data packets
            or               di,di                   ; Check for data packets to send
            jnz              Do_Alter                ; Jump if data packets to send
            jmp              Alter_Exit              ; Go return control to the caller
Do_Alter:
            lea              bp,ss:[bp.Packet_Data]  ; Setup to send the data packets
Packet_Send:
            mov              cx,ss:[bp]              ; Get the next packet type
            add              bp,2                    ; Increment past the packet type
            mov              ax,cx                   ; Get the data packet type
            and              ax,TYPE_MASK            ; Mask off all but packet type
            Write_RSTDATA    ax                      ; Send the data packet type
            test             cx,ALTERED              ; Check for an altered data packet
            jz               Not_Altered             ; Jump if packet is NOT altered type
            Read_RSTADDR     ax,si                   ; Get the current TIGA address
            Save             ax,si                   ; Save the current address value
            Save             ss:[bp+4],ss:[bp+2]     ; Save data packet address (Seg,Off)
            Save             ss:[bp]                 ; Save the data packet size
            inc              bx                      ; Increment altered packet count
            If               MEMORY EQ FALSE
            Set_IO           RSTDATA                 ; Restore the current I/O address    IO
            Endif
Not_Altered:
            test             cx,IMMEDIATE            ; Check for immediate or pointer packet
            jnz              Handle_Pointer          ; Jump if a pointer type packet
Handle_Immediate:
            mov              cx,ss:[bp]              ; Get the immediate data size (Bytes)
            add              bp,2                    ; Increment past the data size
            inc              cx                      ; Convert data
            shr              cx,1                    ;               size to
            shl              cx,1                    ;                       even bytes
            Write_RSTDATA    cx                      ; Send the immediate data size
            shr              cx,1                    ; Convert data size to words
            Save             ds                      ; Save the DS segment register
            mov              si,bp                   ; Setup pointer
            mov              ax,ss                   ;               to the
            mov              ds,ax                   ;                       immediate data
Immediate_Send:
            lodsw                                    ; Get the next data word to send
            Write_RSTDATA    ax                      ; Send this data word to buffer
            loop             Immediate_Send          ; Loop till all data words sent
            Restore          ds                      ; Restore the DS segment register
            mov              bp,si                   ; Update the packet pointer
            jmp              Short Packet_Next       ; Go handle the next data packet
Handle_Pointer:
            Save             ds                      ; Save the DS segment register
            test             cx,STRING               ; Check for standard or string pointer
            jz               Handle_Standard         ; Jump if a standard pointer packet
Handle_String:
            add              bp,2                    ; Skip past packet size (Zero anyway)
            mov              cx,MAX_WORD             ; Setup to calculate string length
            lds              si,ss:[bp]              ; Setup pointer to string data
Get_Next:
            lodsb                                    ; Get next character from the string
            or               al,al                   ; Check for end of string (NULL)
            jz               String_End              ; Jump if we found the end of string
            loop             Get_Next                ; Loop till we find the end of string
String_End:
            neg              cx                      ; Compute string length including NULL
            jmp              short Send_Length       ; Go continue with the pointer packet
Handle_Standard:
            mov              cx,ss:[bp]              ; Get the pointer data size (Bytes)
            add              bp,2                    ; Increment past the data size
Send_Length:
            inc              cx                      ; Convert data
            shr              cx,1                    ;               size to
            shl              cx,1                    ;                       even bytes
            Write_RSTDATA    cx                      ; Send the pointer data size
            shr              cx,1                    ; Convert data size to words
            lds              si,ss:[bp]              ; Setup pointer to pointer data
            add              bp,4                    ; Increment past the data pointer
Pointer_Send:
            lodsw                                    ; Get the next data word to send
            Write_RSTDATA    ax                      ; Send this data word to buffer
            loop             Pointer_Send            ; Loop till all data words sent
            Restore          ds                      ; Restore the DS segment register
Packet_Next:
```

```
        dec     di                      ; Decrement the packet counter
        jz      Packets_Done            ; Jump if more packets to send
        jmp     Packet_Send             ; Send remaining packets
Packets_Done:
        push    bx                      ; Save the number of altered packets
        call    Exec_Cmd                ; Call routine to execute the command
        call    Wait_Cmd                ; Call routine to wait for completion
        pop     bx                      ; Restore number of altered data packets
        or      bx,bx                   ; Check for altered data packets
        jz      Alter_Exit              ; Jump if NO altered data packets
Alter_Packet:
        Restore cx                      ; Restore the packet size value
        Restore ds,si                   ; Restore data packet address (Seg,Off)
        Restore di,ax                   ; Restore TIGA data address (Bit)
        add     ax,HEADER               ; Adjust address for
        adc     di,0                    ;              data header
        Write_HSTADDR di,ax             ; Setup to read the altered data packet
        If      MEMORY EQ FALSE
        Set_IO  HSTDATA                 ; Keep register load out of loop    IO
        Endif
        cmp     cx,1                    ; If packet size is one byte,
        je      Read_Byte               ;   then read it
        Save    cx                      ; Save packet size (# bytes) value
        shr     cx,1                    ; Convert packet size to words
Read_Data:
        Read_HSTDATA    ax              ; Read the next data value
        mov     ds:[si],ax              ; Save the data value in buffer
        add     si,2                    ; Increment the buffer pointer
        loop    Read_Data               ; Loop till all data is read
        Restore cx                      ; Restore packet size (# bytes)
        shr     cx,1                    ; If original packet size is even
        jnc     More_Packets            ;   # of bytes, then done!
Read_Byte:
        Read_HSTDATA    ax              ; Otherwise, load remaining byte
        mov     ds:[si],ax              ;   and save it
More_Packets:
        dec     bx                      ; Decrement altered packet counter
        jnz     Alter_Packet            ; Jump if more packets to process
Alter_Exit:
        Restore ds                      ; Restore the required registers
        ret                             ; Return control to the caller
Alter   Endp                            ; End of the Alter procedure
;*************************************************************************
;
; Routine Functional Description
;
;       Parse(Stack_Frame)
;
;               Clear count of packet size
;               Skip to start of packet data
;               Get the number of data packets
;               Increment past the packet count (2 Bytes)
;               While there are more packets to parse
;                       Get the next packet type
;                       Increment past the packet type (2 Bytes)
;                       If immediate type data packet
;                               Get size of immediate data packet
;                               Increment past immediate data size (2 Bytes)
;                               Round size up to an even number of bytes
;                               Add size in to the data packet count
;                               Increment past immediate data (Data Size Bytes)
;                       Else
;                               If packet type is string data
;                                       Parse string to get number of bytes
;                               Else
;                                       Get number of data bytes from stack
;                               Endif
;                               Increment past packet data size (2 Bytes)
;                               Round size up to an even number of bytes
;                               Add size in to the data packet count
;                               Increment past data pointer (4 Bytes)
;                       Endif
;                       Decrement the packet counter
;               EndWhile
;
;       Registers on Entry:
;
```

```
;                DS       = Data segment
;                ES       = Host port segment (If memory mapped)
;                SS:BP    = Pointer to stack frame
;
;        Registers on Exit:
;
;                AX       = Destroyed
;                CX:BX    = Size of data in packets (Bit)
;                DI       = Destroyed
;                BP       = Stack frame pointer updated
;
;******************************************************************
Parse           Proc     Near            ; C packet parse procedure
        xor     bx,bx                    ; Zero the packet
        xor     cx,cx                    ;            data count (32 Bit)
        add     bp,Packet_Count          ; Skip to number of data packets
        mov     di,ss:[bp]               ; Get the number of data packets
        or      di,di                    ; Check for data packets to send
        jz      Parse_Exit               ; Jump if no data packets to send
        add     bx,2                     ; Increment data count
        adc     cx,0                     ;            for packet count
        add     bp,2                     ; Skip past the number of packets
Parse_Packet:
        mov     ax,ss:[bp]               ; Get the next packet type
        add     bp,2                     ; Increment past the packet type
        add     bx,2                     ; Increment data count
        adc     cx,0                     ;            for packet type
        test    ax,IMMEDIATE             ; Check for immediate or pointer packet
        jnz     Parse_Pointer            ; Jump if a pointer type packet
Parse_Immediate:
        mov     ax,ss:[bp]               ; Get the immediate data size (Bytes)
        add     bp,2                     ; Increment past the data size
        add     bx,2                     ; Increment data count
        adc     cx,0                     ;            for data size
        inc     ax                       ; Convert data
        shr     ax,1                     ;            size to
        shl     ax,1                     ;                    even bytes
        add     bx,ax                    ; Increment data count
        adc     cx,0                     ;            for packet size
        add     bp,ax                    ; Increment past the immediate data
        jmp     Short Parse_Next_Packet  ; Go parse the next data packet
Parse_Pointer:
        Save    ds                       ; Save the DS segment register
        test    ax,STRING                ; Check for standard or string pointer
        jz      Parse_Standard           ; Jump if standard pointer packet
Parse_String:
        add     bp,2                     ; Skip past packet size (Zero anyway)
        xor     ax,ax                    ; Setup to calculate string length
        lds     si,ss:[bp]               ; Setup pointer to string data
Parse_Next:
        inc     ax                       ; Increment the string length counter
        cmp     Byte Ptr ds:[si],NULL    ; Check for end of string (NULL)
        inc     si                       ; Increment to next string character
        jz      Add_Length               ; Jump if we found the end of string
        jmp     Short Parse_Next         ; Keep parsing till we find the end
Parse_Standard:
        mov     ax,ss:[bp]               ; Get the pointer data size (Bytes)
        add     bp,2                     ; Increment past the data size
        add     bx,2                     ; Increment data count
        adc     cx,0                     ;            for data size
Add_Length:
        inc     ax                       ; Convert data
        shr     ax,1                     ;            size to
        shl     ax,1                     ;                    even bytes
        add     bx,ax                    ; Increment data count
        adc     cx,0                     ;            for packet size
        add     bp,4                     ; Increment past the data pointer
        Restore ds                       ; Restore the DS segment register
Parse_Next_Packet:
        dec     di                       ; Decrement the packet counter
        jnz     Parse_Packet             ; Jump if more packets to parse
Parse_Exit:
        ret                              ; Return control to the caller
Parse           Endp                     ; End of the Parse procedure
Code    Ends                             ; End of the code segment
        End                              ; End of the Cp module
```

Appendix G

```
        Page    58,132
        Title   CPALT           Copyright (c) 1988,89 Texas Instruments Inc.
;*************************************************************************
;
; Name:     CPALT           C Packet Alternate Routine
;
;*************************************************************************
;
; Module Functional Description:
;
;       This module contains code for TIGA C packet callable
;       alternate routines that have return values. The format for
;       the data is as follows:
;
;               Command Number              Word
;               Number of Packets           Word
;               Pointer to Packet Data      Dword (Far)
;
;*************************************************************************
        Page
;
; Public Declarations
;
        Public  _CP_Alt              ; TIGA C packet command routine
        Public  _CP_Alt_A            ; TIGA C packet alternate routine
;
; External Declarations
;
Code    Segment Byte Public 'CODE'   ; Standard code segment
        Extrn   Exec_Cmd:Near        ; Execute TIGA command
        Extrn   Next_Buffer:Near     ; Get next buffer routine
        Extrn   Alter:Near           ; Send alter packet data routine
        Extrn   Allocate:Near        ; Allocate memory routine
        Extrn   Parse:Near           ; Parse packet routine
        Extrn   Return:Near          ; Get return value routine
Code    Ends                         ; End of code segment
Data    Segment Byte Public 'DATA'   ; Standard data segment
        Extrn   Data_BufL:Word       ; Current buffer
        Extrn   Data_BufH:Word       ;              data address
        Extrn   Current_Cmd:Word     ; Current command code
        Extrn   Error_Function:Dword ; Current error function address
        Extrn   Old_ds:Word          ; Ds prior to driver call
        Extrn   Data_Field:Word      ; Actual data field size
Data    Ends                         ; End of the data segment
;
; Include Files
;
        Include Defs.Inc             ; Include hardware dependent items
        Include Macro.Inc            ; Include macro definitions
        Initialize                   ; Setup the processor options
        Page
;
; LOCAL Equates
;
IMMEDIATE       Equ     01h          ; Immediate/pointer packet type flag
ABORT_CODE      Equ     0FFFFh       ; Abort error code value (-1)
        Page
;
; Define the local stack frame
;
Stack_Frame     Struc                ; Define the local stack frame
Saved_BP        Dw      ?            ; Saved BP register value
Ret_Addr        Dd      ?            ; Return address (Far return)
Command_Code    Dw      ?            ; Direct mode command number
Packet_Count    Dw      ?            ; Number of data packets
Packet_Data     Dw      ?            ; Start of the packet data
Stack_Frame     Ends                 ; End of the local stack frame
;
;       Define the standard code segment
;
Code    Segment Byte Public 'CODE'   ; Standard code segment
        Assume  cs:Code, ds:Data, es:nothing
        Page
;*************************************************************************
;
```

```
; Routine Functional Description
;
;       _CP_Alt(Stack_Frame)
;
;               Setup pointer to the stack frame
;               Save the required registers
;               Save the requested command code
;               Call routine to get next free buffer
;               Get address of the data buffer (Standard)
;               Call routine to handle altered data
;               Call routine to get the return value
;               Restore the required registers
;               Clear the stack frame
;               Return control to the caller
;
;       Registers on Entry:
;
;               SS:SP = Pointer to stack frame
;
;       Registers on Exit:
;
;               AX-DX = Destroyed
;               ES    = Destroyed
;               FL    = Direction flag cleared
;
;****************************************************************
_CP_Alt         Proc    Far                     ; C packet alternate procedure
        push    bp                              ; Setup accessibility
        mov     bp,sp                           ;       to stack frame
        Save    si,di,ds                        ; Save the required registers
        cld                                     ; Clear the direction flag
        Setup_ds                                ; Setup access to the data segment
        Setup_IF                                ; Setup interface to GSP
        mov     ax,ss:[bp.Command_Code]         ; Get the requested command code
        mov     ds:[Current_Cmd],ax             ; Save the current command code
        call    Next_Buffer                     ; Call routine to get next free buffer
        mov     si,ds:[Data_BufL]               ; Get address of
        mov     di,ds:[Data_BufH]               ;       the data buffer (Bit)
        call    Alter                           ; Call routine to handle altered data
        call    Return                          ; Call routine to get return value
        Restore si,di,ds                        ; Restore the required registers
        pop     bp                              ; Clear the stack frame
        ret                                     ; Return control to the caller
_CP_Alt         Endp                            ; End of the _CP_Alt procedure
        Page
;****************************************************************
;
; Routine Functional Description
;
;       _CP_Alt_A(Stack_Frame)
;
;               Setup pointer to the stack frame
;               Save the required registers
;               Save the requested command code
;               Call routine to get next free buffer
;               Call routine to parse the data packets (Get size)
;               If packet data size is greater than packet buffer size
;                       Call routine to allocate memory
;                       If memory is available
;                               Setup data buffer to allocated memory
;                       Else
;                               Get out of memory error code value
;                               Call the current error function
;                               Abort the packet transfer
;                       Endif
;               Else
;                       Setup to use standard packet data buffer
;               Endif
;               Call routine to handle altered data
;               Call routine to get the return value
;               Restore the required registers
;               Clear the stack frame
;               Return control to the caller
;
;       Registers on Entry:
;
```

```
;                  SS:SP = Pointer to stack frame
;
;          Registers on Exit:
;
;                  AX-DX = Destroyed
;                  ES    = Destroyed
;                  FL    = Direction flag cleared
;
;**********************************************************************
_CP_Alt_A       Proc    Far             ; C packet alternate procedure
        push    bp                      ; Setup accessibility
        mov     bp,sp                   ;                    to stack frame
        Save    si,di,ds                ; Save the required registers
        cld                             ; Clear the direction flag
        Setup_ds                        ; Setup access to the data segment
        Setup_IF                        ; Setup interface to GSP
        mov     ax,ss:[bp.Command_Code] ; Get the requested command code
        mov     ds:[Current_Cmd],ax     ; Save the current command code
        call    Next_Buffer             ; Call routine to get next free buffer
        push    bp                      ; Save the stack frame pointer
        call    Parse                   ; Call routine to parse the packets
        or      cx,cx                   ; Check for large number of packets
        jnz     Alloc_Memory            ; Jump if a large number of packets
        mov     ax,ds:[Data_Field]      ; Get the data field size (Words)
        shl     ax,1                    ; Convert data field size to bytes
        cmp     bx,ax                   ; Check packet size against maximum
        jbe     Standard_Buffer         ; Jump if data will fit in standard
Alloc_Memory:
        call    Allocate                ; Call routine to allocate the memory
        jnc     Short Send_Data         ; Go send packet data if memory
        mov     ax,OUT_OF_MEMORY        ; Get the out of memory error code
        Call_ErrorHandler ax            ; Call error handler
        pop     bp                      ; Restore the stack frame pointer
        mov     ax,ABORT_CODE           ; Setup the abort
        mov     dx,ax                   ;              error code (-1)
        jmp     Short Alt_exit          ; Go return control to the caller
Standard_Buffer:
        mov     si,ds:[Data_BufL]       ; Get address of
        mov     di,ds:[Data_BufH]       ;              the data buffer (Bit)
Send_Data:
        pop     bp                      ; Restore the stack frame pointer
        call    Alter                   ; Call routine to handle altered data
        call    Return                  ; Call routine to get return value
Alt_exit:
        Restore si,di,ds                ; Restore the required registers
        pop     bp                      ; Clear the stack frame
        ret                             ; Return control to the caller
_CP_Alt_A       Endp                    ; End of the _CP_Alt_A procedure
Code            Ends                    ; End of the code segment
        End                             ; End of the CP_Alt module
```

Appendix H

```
;--------------------------------------------------------------------;
;                              TIGA                                  ;
;          Copyright (c) 1988,89 Texas Instruments Inc.              ;
;--------------------------------------------------------------------;
; TIGA - Graphics Manager                                            ;
;--------------------------------------------------------------------;
;                                                                    ;
; General: Function and argument handler.                            ;
;                                                                    ;
;   Usage: cpacket(FnAddr, ptdata)                                   ;
;                                                                    ;
;       FnAddr  - Address of function to be executed                 ;
;                                                                    ;
;       ptdata  - Pointer to the argument packets to pass to the     ;
;                 desired function.                                  ;
;                                                                    ;
;   Notes: - A0 contains the return value of the function called    ;
;--------------------------------------------------------------------;
        .copy   gspregs.inc
        .globl  _cpacket
        .globl  cp_call
;
```

```
; *** Function Entry Point ***
;
_cpacket:
        setf    16,0,0
        move    *-STK,A8,1      ; Get function address mmtm    SP,A0,A1,A2,A3,A4,A5
start_command:
        move    *-STK,A0,1
        move    A0,A5            ; A0 = Data ptr
        move    *A0,A1,0         ; and save it in A5
        jrz     cp_call          ; Get number of packets
        move    A14,-*SP,1       ; Jump if there are no packets set_up_packet:
        move    A5,A0
        addk    16,A0            ; A0 = Data ptr
        move    A1,A2            ; A2 = Temp packet count
move_pointer:
        move    *A0+,A3,0        ; Get packet type
        move    *A0+,A4,0        ; Get packet length
        subk    1,A2
        jrz     last_packet      ; Jump if on last packet
        sll     3,A4             ; A4 = Packet bit length
        add     A4,A0            ; A0 now points to next packet
        jruc    move_pointer last_packet:
        srl     1,A3             ; Check packet type
        jrc     ptr_val          ; Jump if pointer value im_val:
        subk    2,A4             ; Check data size
        jrle    pass_short
        move    *A0,A3,1         ; Get value
        move    A3,*STK+,1       ; Put value on stack
        jruc    packet_done
pass_short:
        srl     1,A3             ; Check for signed shorts
        jrc     signed_short     ; Jump if pointer value
        move    *A0,A3,0         ; Get value
        move    A3,*STK+,1       ; Put it on stack
        jruc    packet_done
signed_short:
        setf    16,1,0           ; sign extend this move only
        move    *A0,A3,0         ; Get value
        move    A3,*STK+,1       ; Put it on stack
        setf    16,0,0           ; restore FS0 to zero extend
        jruc    packet_done ptr_val:
        move    A0,*STK+,1       ; Put pointer on stack packet_done:
        subk    1,A1
        jrnz    set_up_packet    ; Set up next packet if still more cp_call:
        call    A8               ; Call it mmfm    SP,A0,A1,A2,A3,A4,A5
        rets    2
```

Appendix I

What is claimed is:

1. A method of partitioning a software program, which is written in a single procedural and processor independent computer language for execution by a single processor and which includes at least one call to a function, into a main program executing on a first processor and a subprogram executing on a second processor, said first and second processors connected by a communication means, comprising the steps of:

selecting a function of said software program to be executed by said second processor;

forming a main program from said software program including said calls to said selected function but not including a definition of said selected function;

forming a subprogram from said software program including a definition of said selected function;

identifying said selected function globally to said main program and said subprogram;

restructuring each call of said selected function within said main program, such that an argument passing means common to said first processor and said second processor is created; and modifying said subprogram consistent with said argument passing means, to create a form executable by said second processor which receives arguments for said selected function via said argument passing means;

compiling said main program to run on said first processor;

running said compiled main program on said first processor, including transmitting calls to said selected function from said first processor to said second processor via said communications means;

compiling said subprogram to run on said second processor;

running said compiled subprogram on said second processor, including executing said selected function in response to calls to said selected function from said main program received via said communications means.

2. The method of claim 1, wherein said identifying step comprises assigning a global function name to said selected function.

3. The method of claim 1, wherein said argument passing means comprises data pertaining to the type of call, with respect to whether the selected function returns a value or modifies a variable.

4. The method of claim 1, wherein said argument passing means comprises data representing a function identifier, which corresponds to said step of globally identifying said selected function.

5. The method of claim 1, wherein said argument passing means comprises data relevant to the size and type of said selected function parameters and defining structures for passing said parameters.

6. The method of claim 5, wherein said data further comprises data pertaining to the location of data represented by said parameters.

7. The method of claim 1, wherein said call restructuring step is performed with a software preprocessor.

8. The method of claim 1, wherein at least one of said selecting step, said call restructuring step, or said modifying step is performed automatically with other programming.

9. The method of claim 1, wherein said selected function may be executed on any one of a number of second processors, and wherein said identifying step identifies said selected function to said second processors, and wherein said argument passing means is common to said second processors.

10. A method of partitioning a software program, which is written in a single procedural and processor independent computer language for execution by a single processor and which includes at least one call to a function, into a main program executing on a first processor and a subprogram executing on a second processor, said first and second processors connected by a communication means, comprising the steps of:

selecting a function of said software program to be executed by said second processor;

forming a main program from said software program including said calls to said selected function but not including a definition of said selected function;

forming a subprogram from said software program including a definition of said selected function;

identifying said selected function globally to said main program and said subprogram;

defining each call of said selected function in a packet format, such that an argument passing means common to said first processor and said second processor is created; and modifying said subprogram consistent with said packet format, to create a form executable by said second processor which receives arguments for said selected function via said packet format;

compiling said main program to run on said first processor;

running said compiled main program on said first processor, including transmitting calls to said selected function from said first processor to said second processor via said packet format on said communications means;

compiling said subprogram to run on said second processor;

running said compiled subprogram on said second processor, including executing said selected function in response to calls to said selected function from said main program received via said packet format via said communications means.

11. The method of claim 10, wherein said identifying step comprises assigning a global function name to said selected function.

12. The method of claim 10, wherein said argument passing means comprises data pertaining to the type of call, with respect to whether the selected function returns a value or modifies a variable.

13. The method of claim 10, wherein said argument passing means comprises data representing a function identifier, which corresponds to said step of globally identifying said selected function.

14. The method of claim 10, wherein said argument passing means comprises data pertaining to the size and type of data represented by selection function parameters.

15. The method of claim 14, wherein said argument data further comprises data pertaining to the location of data represented by said parameters.

16. The method of claim 10, wherein said defining step is performed with a software preprocessor.

17. The method of claim 10, wherein at least one of said selecting step or said defining step is performed automatically with other programming.

18. The method of claim 10, wherein said selected function may be executed on any one of a number of second processors, and wherein said identifying step identifies said selected function to said second processors, and wherein said argument passing means is common to said second processors.

19. The method of claim 1, wherein said selected function is a command function requiring no return of data to said main program, wherein:

said step of restructuring each call of said selected function includes restructuring each call of said selected function to transmit a function identifier via said argument passing means; and said step of modifying said subprogram includes modifying said subprogram to execute said selected function upon receipt of said function identifier via said argument passing means.

20. The method of claim 1, wherein said selected function is a function requiring return of a single data type to said main program, wherein:
said step of restructuring each call of said selected function includes restructuring each call of said selected function to transmit a function identifier via said argument passing means and to receive return data in the form of said single data type; and
said step of modifying said subprogram includes modifying said subprogram to execute said selected function upon receipt of said function identifier via said argument passing means and to transmit return data in the form of said single date type via said argument passing means.

21. The method of claim 1, wherein said selected function is a function requiring modification of data identified by a pointer, wherein:
said step of restructuring each call of said selected function includes restructuring each call of said selected function to transmit a function identifier via said argument passing means, to transmit said data identified by said pointer, to receive modified data and to replace said data identified by said pointer with said modified data; and
said step of modifying said subprogram includes modifying said subprogram to execute said selected function upon receipt of said function identifier via said argument passing means, to receive data to be modified and to transmit modified data via said argument passing means.

22. The method of claim 10, wherein said selected function is a command function requiring no return of data to said main program, wherein:
said step of restructuring each call of said selected function includes restructuring each call of said selected function to transmit a function identifier via a single packet; and
said step of modifying said subprogram includes modifying said subprogram to execute said selected function upon receipt of said function identifier via said single packet.

23. The method of claim 10, wherein said selected function is a function requiring return of a single data type to said main program, wherein:
said step of restructuring each call of said selected function includes restructuring each call of said selected function to transmit a function identifier via a single packet and to receive return data in the form of said single data type via a single packet; and
said step of modifying said subprogram includes modifying said subprogram to execute said selected function upon receipt of said function identifier via a single packet and to transmit return data in the form of said single date type via a single packet.

24. The method of claim 10, wherein said selected function is a function requiring modification of data identified by a pointer, wherein:
said step of restructuring each call of said selected function includes restructuring each call of said selected function to transmit a function identifier and said data identified by said pointer via plural packets, to receive modified data via plural packets and to replace said data identified by said pointer with said modified data; and
said step of modifying said subprogram includes modifying said subprogram to execute said selected function upon receipt of said function identifier, to receive data to be modified via plural packets and to transmit modified data via plural packets.

25. A method of extending a software program, which is written in a single procedural and processor independent computer language for execution by a single processor, into a main program executing on a first processor and a subprogram executing on a second processor, said first and second processors connected by a communication means, comprising the steps of:
defining a function of said software program to be executed by said second processor;
forming a main program from said software program including calls to said defined function but not including a definition of said defined function, each call of said defined function within said main program employing an argument passing means common to said first processor and said second processor;
forming a subprogram from said software program including a definition of said defined function;
identifying said defined function globally to said main program and said subprogram;
modifying said subprogram consistent with said argument passing means, to create a form executable by said second processor which receives arguments for said selected function via said argument passing means;
compiling said main program to run on said first processor;
running said compiled main program on said first processor, including transmitting calls to said selected function from said first processor to said second processor via said communications means;
compiling said subprogram to run on said second processor;
running said compiled subprogram on said second processor, including executing said selected function in response to calls to said selected function from said main program received via said communications means.

26. The method of claim 25, wherein said identifying step comprised assigning a global function name to said defined function.

27. The method of claim 25, wherein said argument passing means comprises data pertaining to the type of call, with respect to whether the defined function returns a value or modifies a variable.

28. The method of claim 25, wherein said argument passing means comprises data representing a function identifier, which corresponds to said step of globally identifying said defined function.

29. The method of claim 25, wherein said argument passing means comprises data relevant to the size and type of said defined function parameters and defining structure for passing said parameters.

30. The method of claim 29, wherein said data further comprised data pertaining to the location of data represented by said parameters.

31. The method of claim 25, wherein said defined function may be executed on any one of a number of second processors, and wherein said identifying step identifies said defined function to said second processors, and wherein said argument passing means is common to said second processors.

32. The method of claim 25, wherein:
said step of defining a function defines a command function requiring no return of data to said main program;

said step of forming a main program includes forming each call of said selected function to transmit a function identifier via said argument passing means; and said step of modifying said subprogram includes modifying said subprogram to execute said selected function upon receipt of said function identifier via said argument passing means.

33. The method of claim 25, wherein:

said step of defining a function defines a command function requiring return of a single data type to said main program;

said step of forming said main program includes forming each call of said defined function to transmit a function identifier via said argument passing means and to receive return data in the form of said single data type; and said step of modifying said subprogram includes modifying said subprogram to execute said selected function upon receipt of said function identifier via said argument passing means and to transmit return data in the form of said single date type via said argument passing means.

34. The method of claim 25, wherein;

said step of defining a function defines a function requiring modification of data identified by a pointer;

said step of forming said main program includes forming each call of said defined function to transmit a function identifier via said argument passing means, to transmit said data identified by said pointer, to receive modified data and to replace said data identified by said pointer with said modified data; and said step of modifying said subprogram includes modifying said subprogram to execute said selected function upon receipt of said function identifier via said argument passing means, to receive data to be modified and to transit modified data via said argument passing means.

* * * * *